United States Patent
Sinner et al.

[11] Patent Number: 5,806,916
[45] Date of Patent: Sep. 15, 1998

[54] CROSS MEMBER FOR MOUNTING INSTRUMENT PANEL

[75] Inventors: Michael Sinner, Rottenburg; Martin Kruse, Sindelfingen; Bernhard Holzapfel, Remshalden; Ulrich Schick, Nagold; Stefan Reh, Woerth, all of Germany

[73] Assignees: Mercedes-Benz AG, Stuttgart, Germany; MC Micro Compact Car Aktiengesellschaft, Biel, Switzerland; Petri Aktiengesellschaft, Aschaffenburg, Germany

[21] Appl. No.: 706,072

[22] Filed: Aug. 30, 1996

[30] Foreign Application Priority Data

Aug. 30, 1995 [DE] Germany ............ 195 31 876.5

[51] Int. Cl.⁶ .................................................. B62D 25/14
[52] U.S. Cl. ........................... 296/187; 296/72; 180/90
[58] Field of Search ................................. 296/187, 194, 296/29, 70–73; 180/90

[56] References Cited

U.S. PATENT DOCUMENTS 2,818,933  1/1958  Tell ........................................... 296/70
4,327,937  5/1982  Scholz et al. ............................. 180/90

FOREIGN PATENT DOCUMENTS

| 42 04 495 | 8/1993 | Germany . |
| 43 26 910 | 2/1994 | Germany . |
| 42 32 846 | 3/1994 | Germany . |
| 43 38 666 | 5/1995 | Germany . |
| 9418788 U | 6/1995 | Germany . |
| 287832 | 12/1986 | Japan ........................ 296/70 |
| 235179 | 9/1988 | Japan ........................ 296/72 |

*Primary Examiner*—Dean Kramer
*Attorney, Agent, or Firm*—Evenson, McKeown, Edwards & Lenahan P.L.L.C.

[57] ABSTRACT

Known cross members consisting of an alloy press-drawn section do not permit easy assembly of the passenger airbag module or other bolt-on parts after the cross members have been installed. Accordingly, the press-drawn section of the cross member is provided with at least one groove open at the top in such fashion that a rib or a bar of a bolt-on part can be added from above such that simple pivoting enables a seating surface of the cross member to cooperate with a mounting surface of the bolt-on part in the installed state. Assembly is extremely simple. The cross members are used for the instrument panels of motor vehicles.

6 Claims, 2 Drawing Sheets

CROSS MEMBER FOR MOUNTING INSTRUMENT PANEL

BACKGROUND AND SUMMARY OF THE INVENTION

The invention relates to a cross member for mounting an instrument panel and, more particularly, to a cross member for fastening the instrument panel as well as the operating and display elements of a motor vehicle. The cross member consists of an alloy press-drawn section having bolted-on parts such as a passenger airbag module and/or brackets for mounting the steering system. The press-drawn section has at least one groove open at the top in the installed position and a seating surface facing the passenger compartment. A bolt-on part is provided with a bar or rib design positively fittable into the open groove. A mounting surface abuts a seating surface in the bolted-on state.

A cross member made from alloy press-drawn parts for the instrument panel of a motor vehicle is known from German patent document DE 42 328 46 A1. The cross member has mounting ribs and holes for mounting a glove compartment or an airbag for example. Since these mounts must be bolted in place, assembly is relatively expensive.

A cross member for the dashboard is likewise known from German patent document DE 42 04 495 C2, designed as a press-drawn section. The cross member is connected laterally with the A-pillars of the motor vehicle and provided with shapes or profile sections that can either serve directly as a duct for laying cables or as mounting sections for hanging a functional part, for example. Here again, however, either a bolt or a holder designed as a spreader clip must be pressed into a corresponding depression to fasten a functional part in place. In particular, it is not possible with known designs to perform a simple assembly of the passenger airbag module for example when the cross member has already been installed. Further disadvantageously, installation is essentially possible only from above.

German patent document DE 43 38 666 A1 shows and describes an airbag housing and its fastening, with a cross member composed of two half shells being provided on its upper side with openings into which the pins of an airbag module engage. The module abuts a seating surface in the lower area of the cross member that faces the passenger compartment and is fastened there by bolts. Even in such designs, simple installation from above cannot be performed.

A cross member of the species recited above is known from German patent document 94 18 788. The press-drawn section provided therein has a groove, open at the top and directed diagonally with respect to the windshield in the installed position. Bolt-on modules with a hook-shaped edge can be hung and pivoted into the bolt-on position. Elastic locking hooks secure the final position at corresponding bars on the press-drawn section. In other embodiments, provision is made for fastening the bolt-on part at the lower end, using self-tapping bolts. However, this latter design still results in the disadvantages listed above. If the bolt-on part is held in place only by elastic forces, a sufficiently stable mount is not always assured, especially in the case of airbag modules.

Hence, the goal of the present invention is to design a cross member of the above-mentioned type, and the corresponding bolt-on parts, in such fashion that a simple and position-independent installation (same section for right hand and left hand drive) is made reliably possible, even when a fastening using bolts from the underside is not possible.

This goal is achieved according to the present invention by a cross member for fastening the instrument panel as well as the operating and display elements of a motor vehicle. The cross member consists of an alloy press-drawn section having bolted-on parts such as a passenger airbag module and/or brackets for mounting the steering system. The press-drawn section has at least one groove open at the top in the installed position and a seating surface facing the passenger compartment. A bolt-on part is provided with a bar or rib design positively fittable into the open groove. A mounting surface abuts a seating surface in the bolted-on state. The seating surface forms a diagonal plane inclined forward at an angle α in the direction of travel of the motor vehicle. The open groove is provided with an undercut on the side located forward and facing the engine compartment. The bar or rib is narrower than the groove. A projection is provided that fits into the undercut. The mounting surface rests on the side of the seating surface facing the passenger compartment, and engages a groove located on the exterior of the press-drawn section by a further projection located on its underside when the projection engages the undercut.

By virtue of this design, firstly a simple hanging or insertion of the bolt-on parts by their upper edges is possible, in such fashion that after hanging by a certain pivoting process, the seating surfaces come to rest against one another, whereby in the final bolt-on state, a positive fit against the underside of the cross member opposite the open groove is achieved. As a result, there is a stable support for the bolt-on part on the cross member over the entire width of the bolt-on part. The bolt-on part, for example an airbag module in the installation state, is held with a supporting surface approximately perpendicular to a possible impact direction, which also applies if a steering bracket is provided as the bolt-on part. The seating surfaces of said bracket in the installed state are approximately perpendicular to the loading direction of the steering axis. Thus, in addition to an assembly which is considerably simplified in this fashion, a stable force-transmitting arrangement can also be produced without a bolt fastening to the underside of the cross member being necessary as in the prior art.

In a preferred embodiment of the invention, between the hangable bar or the rib and a wall of the open groove that is not provided with the undercut, a fitting block can be inserted that produces the final connection. It is also possible, however, to arrange the wall of the groove opposite the undercut so that it is directed diagonally outward with respect to the floor of the groove and to provide a wedge strip equipped with a bolt with respect to the bar or the rib in such fashion that when the bolt is tightened, the strip wedges behind the wall of the groove and a diagonal surface of the bar or rib. This design offers the same installation advantages as the design mentioned at the outset, with a bolting process being necessary only to tighten the wedge strip and therefore requires little installation time. This also applies when the bolt-on part, for example, is in the form of a steering column bracket which, in a preferred embodiment of the invention, consists of a steering column bracket that faces the engine compartment and the passenger compartment. The brackets can be assembled with one another.

The goal that forms the basis of the invention can also be achieved in an advantageous fashion however by having the groove abut the upper edge of the seating surface and form a curved guide for a bar adapted to its cross section or, a rib of the module. The guide can be so designed that in the bolt-on state, the mounting surface of the bolt-on module fits tightly against the mounting surface and a locking bar, associated with the bolt-on part in its underside, engages and/or locks positively with a part in a recess of the press-drawn section. This design has the advantage that bolting is either not required or is needed only to secure the position in a transverse direction. In this embodiment as well, guidance by the groove of the press-drawn section and the rib of the module form a sort of pivot hinge. The advantage of this design is that no additional bolting expense of any kind is required. In the installed state, the curvature of the groove guide prevents the module from being pulled out inadvertently. The guide can be made in the shape of an arc of a circle in the groove in simple fashion. The opposite fastening on the underside of the cross member is also positive.

Other objects, advantages and novel features of the present invention will become apparent from the following detailed description of the invention when considered in conjunction with the accompanying drawings.

DETAILED DESCRIPTION OF THE DRAWINGS

Figure 1:
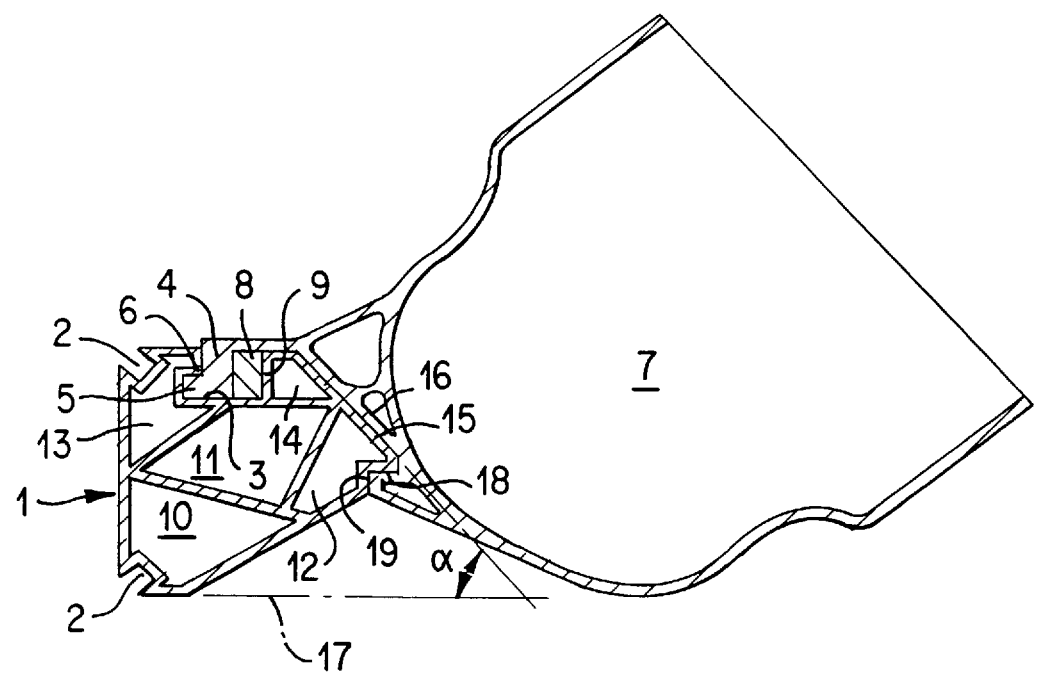
FIG. 1 shows a schematic cross section, parallel to a lengthwise central plane of the vehicle, through the cross member according to the invention, with an airbag module mounted on it in a first embodiment.

FIG. 1 shows a cross member 1 made as a press-drawn section from an alloy. The cross member is made stable by subdividing it into a plurality of hollow chambers 10–14. It is connected or welded at its two ends, not shown, with the A-pillars of a motor vehicle, not shown. This cross member 1 is firstly provided with a shape 2 running lengthwise for example for mounting partition parts or parts of the air conditioning or ventilating system, and it has a groove 3 open at the top. The groove 3 has an undercut 6 on the side facing the engine compartment, not shown. The top opening of the groove 3 is therefore smaller than its bottom. A projection 5 of a bar 4 mounted integrally on a module 7 for the passenger airbag fits beneath this undercut 6. The bar 4, in the bolted-on position of the module 7 shown, is held by a shim 8 inserted positively between a straight wall 9 of the groove 3 and the vertical part of the bar 4.

The cross member 1, apart from the above-mentioned hollow chambers 10, 11, 12, 13, and 14, of which at least a part can be used as cable or air ducts, is provided with a seating surface 15 facing the vehicle interior. The surface 15 is designed as a plane surface inclined forward at an angle α to the horizontal 17 in the direction of travel. This seating surface 15 is abutted by a correspondingly designed mounting surface 16 of the module 7 which makes a transition at its lower end to a projection 18 which is triangular in cross section that engages a groove 19 on the outside of cross-member 1 in the bolted-on state. In addition, the module 7 for the passenger airbag is made from an alloy press-drawn part and, as shown in FIG. 1, can be fastened in very simple fashion to cross member 1, which is already fastened for example between the A-pillars, by inserting the bar 4 with the projection 5 from above into the groove 3, then pivoting the module clockwise and simultaneously pushing it toward the undercut 6 until the seating surface 16 and the projection 18 have assumed the position shown in FIG. 1. Then the shim 8 is pushed in laterally so that module 7 is held positively and permanently in place.

Figure 2:
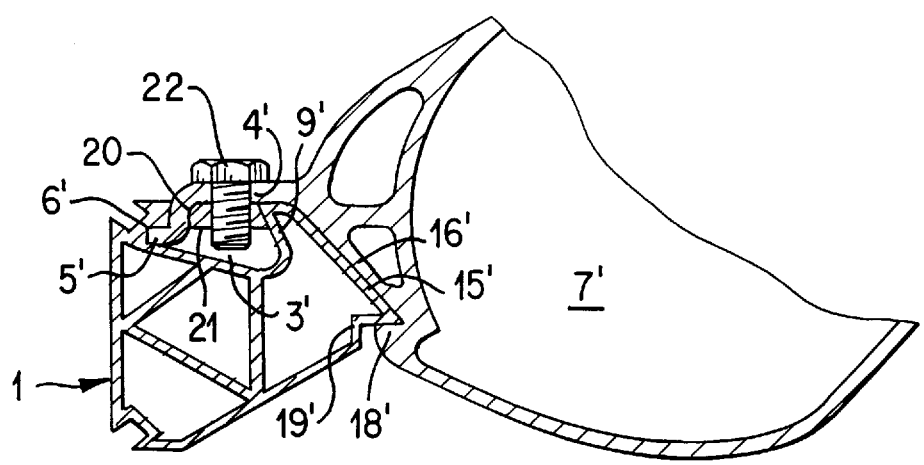
FIG. 2 shows a section similar to FIG. 1, but through a second embodiment.

FIG. 2 shows a variation such that, firstly, the shape of the groove 3', which is open at the top, is made slightly different. A wall 9' runs diagonally outward from the opening, so that the bottom of the groove 3' is much wider than the insertion opening. An undercut 6' is provided in this embodiment as well, however. The projection 5' of the bar 4' fits beneath this undercut 6'. The bar 4' however is provided in this case with a diagonal wall 20 on its interior. The diagonal wall 20 is the mirror image of diagonal wall 9'. A wedge strip 21 and a bolt 22 are associated with the bar 4'. The assembly process in this case is similar to that in the embodiment shown in FIG. 1. The bar 4' is guided into the open groove 3' up to a projection 5'. The module 7' is pivoted clockwise until the projection 5' fits beneath the undercut 6'. In this state, the wedge strip 21, with the bolt loose, is still located in the wider part of the groove 3'. The projection 18' fits behind the groove 19' and then, by tightening the bolt 22, the wedge strip 21 is pulled into the position shown in FIG. 2, in which the module 7' is anchored positively against the cross member 1'.

Figure 3:
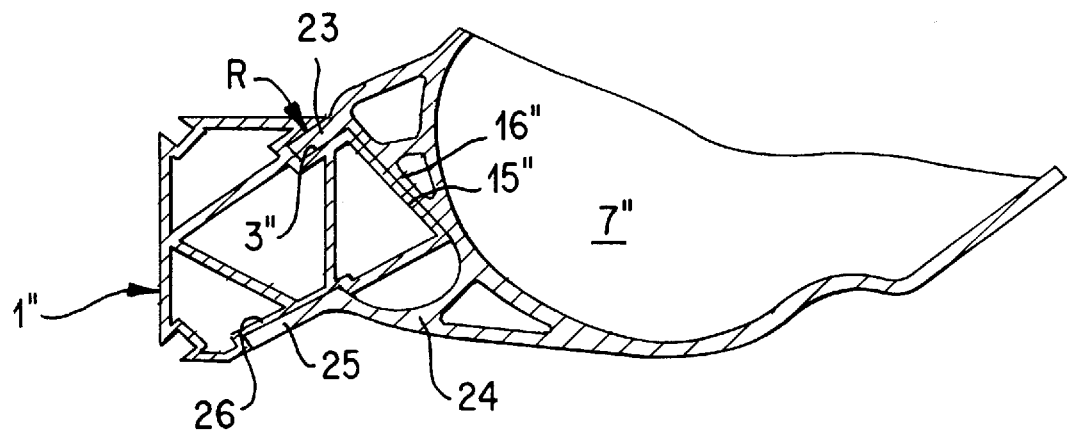
FIG. 3 shows a section similar to FIG. 1, but through a third embodiment.

The embodiment in FIG. 3 constitutes a certain modification of the two designs mentioned above, namely in this case fastening is only possible by positive insertion. For this purpose, cross member 1" is provided on its upper side with a groove 3" inclined diagonally upward relative to the passenger compartment, not shown. The groove is designed as a curved guide for a bar 23 of passenger airbag module 7" and adapted to its cross section. Groove 3" has parallel walls that are both curved to a radius R of a circle. Bar 23 is shaped accordingly. In this design, module 7", in addition to mounting surface 16", has on its underside a supporting bar 24 with a supporting flange 25 inserted into a matching recess 26 of cross member 1" when the bolted-on state has been achieved.

In this embodiment, the free end of bar 23, as in the embodiments in FIGS. 1 and 2, is inserted from above into the guide with groove 3", so that bar 23 can be inserted further and further into groove 3" by pivoting module 7" clockwise until mounting surface 16" abuts seating surface 15", and flange 25, possibly with a slight elastic deformation, locks into its depression 26. It is readily apparent from the bolted-on state shown in FIG. 3 that module 7" can no longer be moved out of this position without flange 25 first being brought out of its locking position; then a backward pivoting movement could be performed for disassembly. The embodiment shown in FIG. 3 does not require any additional work steps for the assembly process. Only a positive insertion from above is performed until the bolted-on state is reached.

Figure 4:
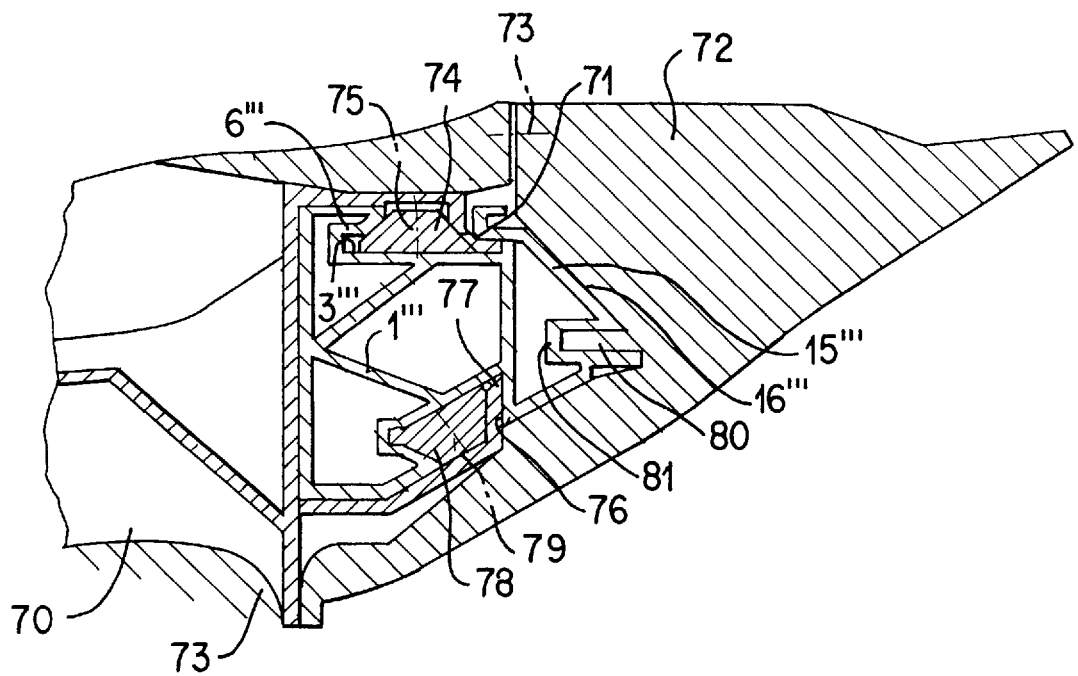
FIG. 4 shows a section similar to FIG. 1, but through a fourth embodiment.

FIG. 4 shows a variation of a bolt-on part for cross member 1'" such that no projection of rear steering bracket 72 engages groove 3'" which is open at the top. The projection otherwise abuts seating surface 15'" of cross member 1'" with its mounting surface 16'". Rear steering bracket 72 is connected instead via an upper and lower bolt connection 73, indicated only schematically, with a forward steering bracket 70, and the latter in turn engages a bar 71 in groove 3'", open at the top and, is held with this bar 71 in this groove 3'" by a wedge-shaped slide 74. The slide is clamped by a bolt, indicated by its axis 75, together with bar 71 in groove 3'". Rear steering bracket 72 also has a mounting bar 76 and engages the latter by a dovetail-shaped groove 77 open at the bottom and held in groove 77 by a wedge-shaped slider 78, likewise held in place by a bolt 79 also indicated only by its axis. To secure it in position, rear bracket 72 also has a rib 80 projecting toward cross member 1'''. Rear steering bracket 72 engages a rectangular groove 81 of cross member 1''' with this rib 80.

In this embodiment, the bolt-on part, which in this case is formed by forward and rear steering brackets, therefore consists of two parts fitted together by a bolt connection 73. The parts abut cross member 1''' on both sides. The part can also be mounted on the member in a simple fashion according to the invention. There is then the very advantageous possibility, without changing the components, of mounting steering brackets 70 and 72 in the positions for the right-hand drive and left-hand drive versions without any special designs being required. By virtue of the design of the cross member and the bolt-on parts, the position of the steering brackets can be chosen anywhere along the entire width of the cross member.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cross member having an alloy press-drawn section for fastening components of a motor vehicle, said press-drawn section having at least one groove with an opening at a top surface in an installed position and a seating surface facing a passenger compartment of the motor vehicle, said component having one of a bar and rib which positively fits into said at least one groove and a mounting surface which abuts said seating surface in a bolted-on state;

wherein the seating surface forms a diagonal plane inclined forward at an angle in a direction of travel of the vehicle;

wherein the at least one groove has an undercut on a side located forward and facing an engine compartment of the motor vehicle;

wherein one of said bar and rib is narrower than said groove so as to be inserted therein without interference, and a first projection of said bar or groove is adapted to fit into said undercut; and wherein said mounting surface rests on a side of said seating surface facing the passenger compartment, and engages a second groove located on an exterior of said press-drawn section via a second projection located on an underside of said cross member when the first projection engages the undercut.

2. The cross member according to claim 1, further comprising a shim arranged between said one bar or groove and a wall of said groove not provided with said undercut.

3. The cross member according to claim 1, wherein said component is a steering column bracket which faces an engine compartment and a passenger compartment.

4. The cross member according to claim 3, wherein said steering column bracket comprises two parts assembled to one another, one of said two parts forming a forward steering bracket and the other of said two parts forming a rear steering bracket.

5. The cross member according to claim 1, wherein said components are an instrument panel and operating and display elements of the motor vehicle.

6. A cross member having an alloy press-drawn section for fastening components of a motor vehicle, said press-drawn section having at least one groove with an opening at a top surface in an installed position and a seating surface facing a passenger compartment of the motor vehicle, said component having one of a bar and rib which positively fits into said at least one groove and a mounting surface which abuts said seating surface in a bolted-on state;

wherein the seating surface forms a diagonal plane inclined forward at an angle in a direction of travel of the vehicle;

wherein the at least one groove has an undercut on a side located forward and facing an engine compartment of the motor vehicle;

wherein one of said bar and rib is narrower than said groove so as to be inserted therein without interference, and a first projection of said bar or groove is adapted to fit into said undercut;

wherein said mounting surface rests on a side of said seating surface facing the passenger compartment, and engages a second groove located on an exterior of said press-drawn section via a second projection located on an underside of said cross member when the first projection engages the undercut;

further comprising a wall of said groove opposite said undercut which extends diagonally outward with respect to a bottom of said groove; and a wedge strip provided with a screw associated with said one bar or rib such that when said screw is tightened, said wedge strip wedges behind the wall and a diagonal surface of said bar or rib.

\* \* \* \* \*